US 6,665,177 B2

(12) United States Patent
Chen

(10) Patent No.: US 6,665,177 B2
(45) Date of Patent: Dec. 16, 2003

(54) FASTENING DEVICE FOR DISK DRIVE

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 4 days.

(21) Appl. No.: 09/951,813

(22) Filed: Sep. 12, 2001

(65) Prior Publication Data

US 2003/0048604 A1 Mar. 13, 2003

(51) Int. Cl.[7] .................................................. G06F 1/16
(52) U.S. Cl. ........................................ 361/685; 361/726
(58) Field of Search ................................. 361/679–685, 361/704, 724–726; D8/394; D13/179, 184

(56) References Cited

U.S. PATENT DOCUMENTS

| 5,617,292 A | * | 4/1997 | Steiner | 361/706 |
| 5,801,920 A | * | 9/1998 | Lee | 361/685 |
| 6,061,239 A | * | 5/2000 | Blomquist | 361/704 |
| 6,181,559 B1 | * | 1/2001 | Seo | 361/704 |
| 6,449,817 B1 | * | 9/2002 | Hsu | 24/459 |

* cited by examiner

Primary Examiner—Darren Schuberg
Assistant Examiner—Anthony Q. Edwards
(74) Attorney, Agent, or Firm—Wei Te Chung

(57) ABSTRACT

A fastening device (1) for securing a disk drive (40) in a disk drive bracket (30) includes a clip (10) and an operating body (20) pivotably attached to the clip. The clip has a connecting portion (12) and two locking arms (14) extending away from opposite ends of the connecting portion. A pair of barbs (18) is formed on respective opposite edges of each locking arm. Each locking arm extends into a corresponding through hole (32) of the drive bracket and a corresponding locking aperture (44) of the disk drive. A pair of pivot protrusions (19) is formed on respective opposite edges of the connecting portion. The operating body includes a middle plate (22), two side plates (24) extending perpendicularly from the middle plate, and a manipulating portion (28). The side plates have two stops (25), and two pivot holes (26) defined therein for extension of the pivot protrusions thereinto.

2 Claims, 5 Drawing Sheets

FASTENING DEVICE FOR DISK DRIVE

BACKGROUND OF THE INVENTION

1. Field of the Invention

The present invention relates to fastening devices for securing computer disk drives, and particularly to fastening devices for readily and firmly attaching disk drives to disk drive brackets.

2. Related Art

Many different means and devices are used to mount disk drives to a disk drive bracket in computers. Such disk drives may be compact disk-read only memory (CD-ROM) drives, hard disk drives, floppy disk drives, and the like. One means is to simply screw the disk drive directly to the disk drive bracket of the computer. However, this requires a screwdriver. Installation and removal is thus unduly cumbersome and time-consuming.

As computers have proliferated and improved, various devices have been developed to facilitate installation and removal of disk drives. One conventional device is to install a pair of sliding slots on the disk drive bracket, and a pair of sliding rails on opposite sides of the disk drive. The disk drive is then slid into the bracket along the sliding slots. However, this system needs screws to fix the sliding rails to the disk drive. Thus installation and removal is still cumbersome and time-consuming. Another conventional device does not need screws. Two plastic blocks are mounted to opposite sides of the disk drive. The plastic blocks are then fixed to opposite inner sides of the drive bracket. However, after installation, clearances exist between the disk drive and the drive bracket. The system is thereby prone to cause increased electro magnetic interference (EMI), and be more susceptible to interference from external EMI.

Examples of conventional devices are disclosed in Taiwan Patent Applications Nos. 78201813, 79209891, 82207667, and 82202204; and U.S. Pat. Nos. 5,510,955 and 5,262,923.

An improved fastening device for securing a disk drive to a drive bracket which overcomes the above-mentioned problems is desired.

BRIEF SUMMARY OF THE INVENTION

Accordingly, an object of the present invention is to provide a fastening device for readily securing a disk drive to a disk drive bracket and readily detaching the disk drive therefrom.

Another object of the present invention is to provide a fastening device which firmly fixes a disk drive to a disk drive bracket.

To achieve the above-mentioned objects, a fastening device for securing a disk drive in a disk drive bracket comprises a clip and an operating body pivotably attached to the clip. The clip has a connecting portion and two locking arms extending away from opposite ends of the connecting portion. A pair of barbs is formed on respective opposite edges of each locking arm. Each locking arm extends into a corresponding through hole of the drive bracket and a corresponding locking aperture of the disk drive. A pair of pivot protrusions is formed on respective opposite edges of the connecting portion. The operating body comprises a middle plate, two side plates extending perpendicularly from the middle plate, and a manipulating portion. The side plates have two stops, and two pivot holes defined therein for extension of the pivot protrusions thereinto.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
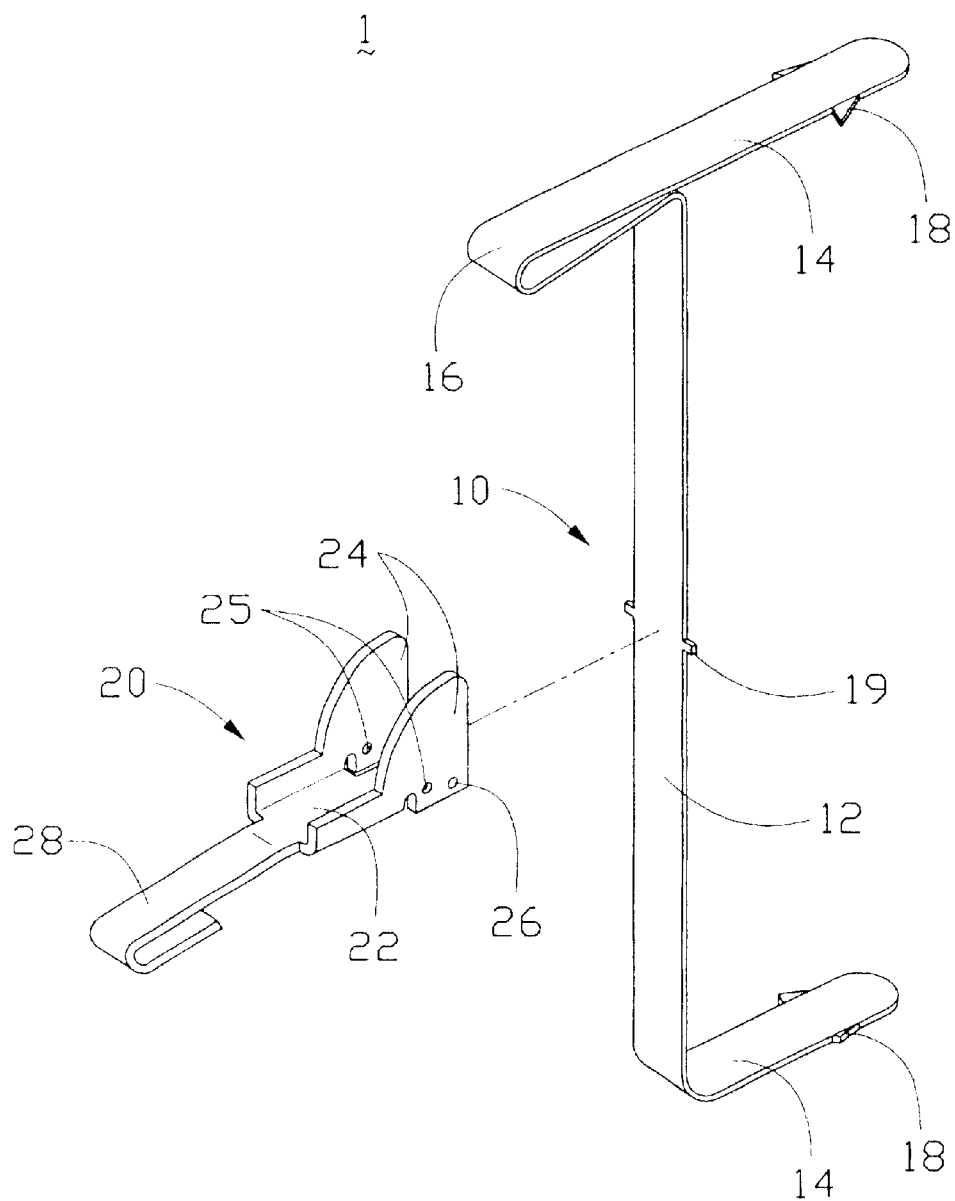
FIG. 1 is an exploded view of a fastening device of the present invention.

Referring to FIGS. 1–5, a fastening device 1 of the present invention is used to secure a disk drive 40 to a disk drive bracket 30. The disk drive 40 may be a compact disk-read only memory (CD-ROM) drive, hard disk drive, floppy disk drive, and so on. The fastening device 1 comprises a clip 10, and an operating body 20 pivotably attached to the clip 10.

One side of the disk drive bracket 30 defines two through holes 32. Two locking apertures 44 are defined in one side wall 42 of the disk drive 40, corresponding to the through holes 32 of the disk drive bracket 30.

Referring to FIG. 1, the clip 10 of the fastening device 1 comprises a connecting portion 12, a handle 16 and a pair of locking arms 14. The handle 16 facilitates manual operation in locking or unlocking the fastening device 1. One locking arm 14 extends perpendicularly from an end of the connecting portion 12. The handle 16 extends perpendicularly from an opposite end of the connecting portion 12, in a direction opposite to the direction in which the said one locking arm 14 extends. The handle 16 further extends outwardly to double back over itself, and further extends in the same direction in which the said one locking arm 14 extends to form another locking arm 14. The two locking arms 14 thus generally oppose each other. Each locking arm 14 has fastening means disposed in the vicinity of a distal end thereof. In the preferred embodiment, the fastening means comprises a pair of barbs 18 formed on respective opposite edges of each locking arm 14. Other suitable fastening means may also be formed thereat. A pair of pivot protrusions 19 is formed on respective opposite edges of the connecting portion 12, at a middle of the connecting portion 12.

The operating body 20 comprises a middle plate 22, and two generally parallel cam-shaped side plates 24 extending perpendicularly from opposite lateral edges of the middle plate 22 respectively. A distance between the two side plates 24 is slightly greater than a width of the connecting portion 12, for easily accommodating the connecting portion 12. Two opposing stops 25 are respectively formed on inner faces of the side plates 24, near the middle plate 22. A pair of coaxial pivot holes 26 is respectively defined in a vicinity of ends of the side plates 24. The operating body 20 further comprises a manipulating portion 28 extending generally coplanarly from an end of the middle plate 22 distal from the side plates 24.

Figure 2:
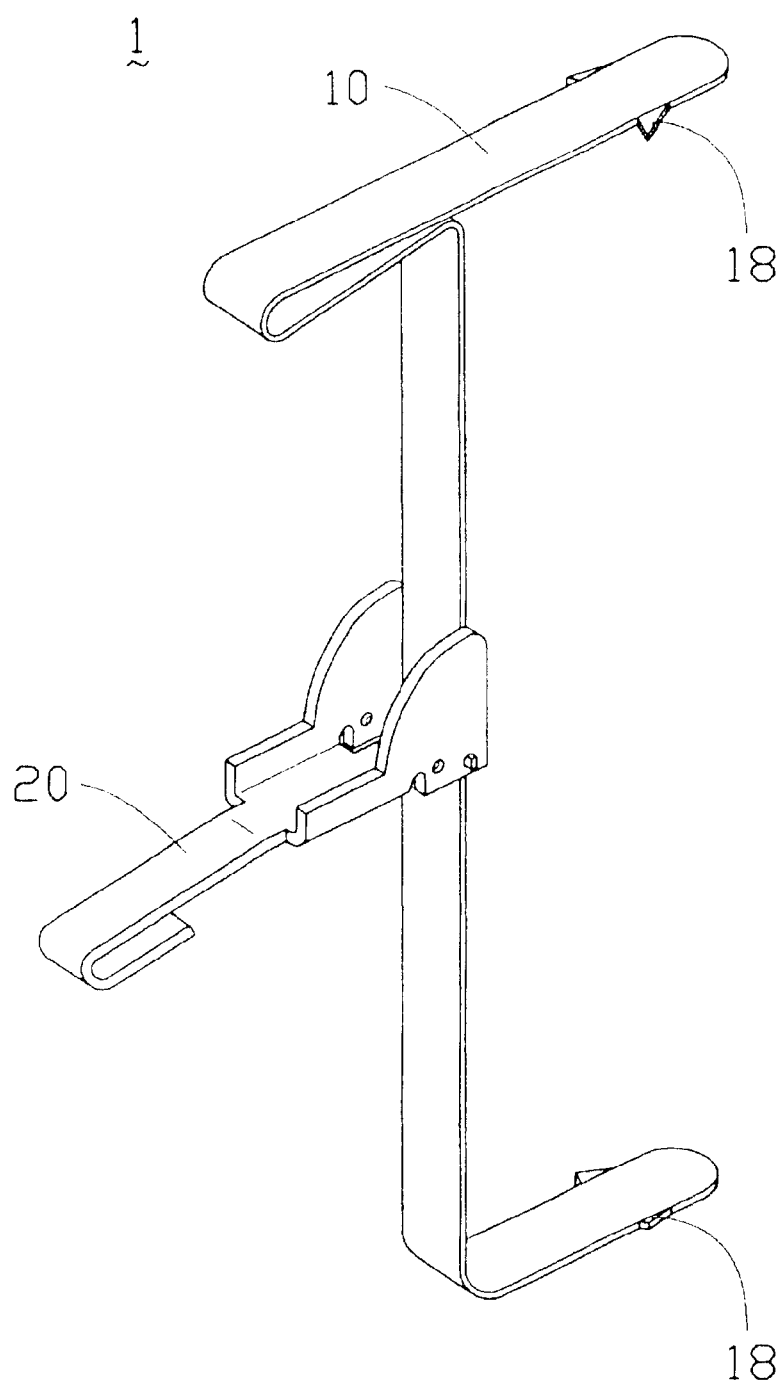
FIG. 2 is an assembled view of the fastening device of FIG. 1 in an unlocked position.
Figure 3:
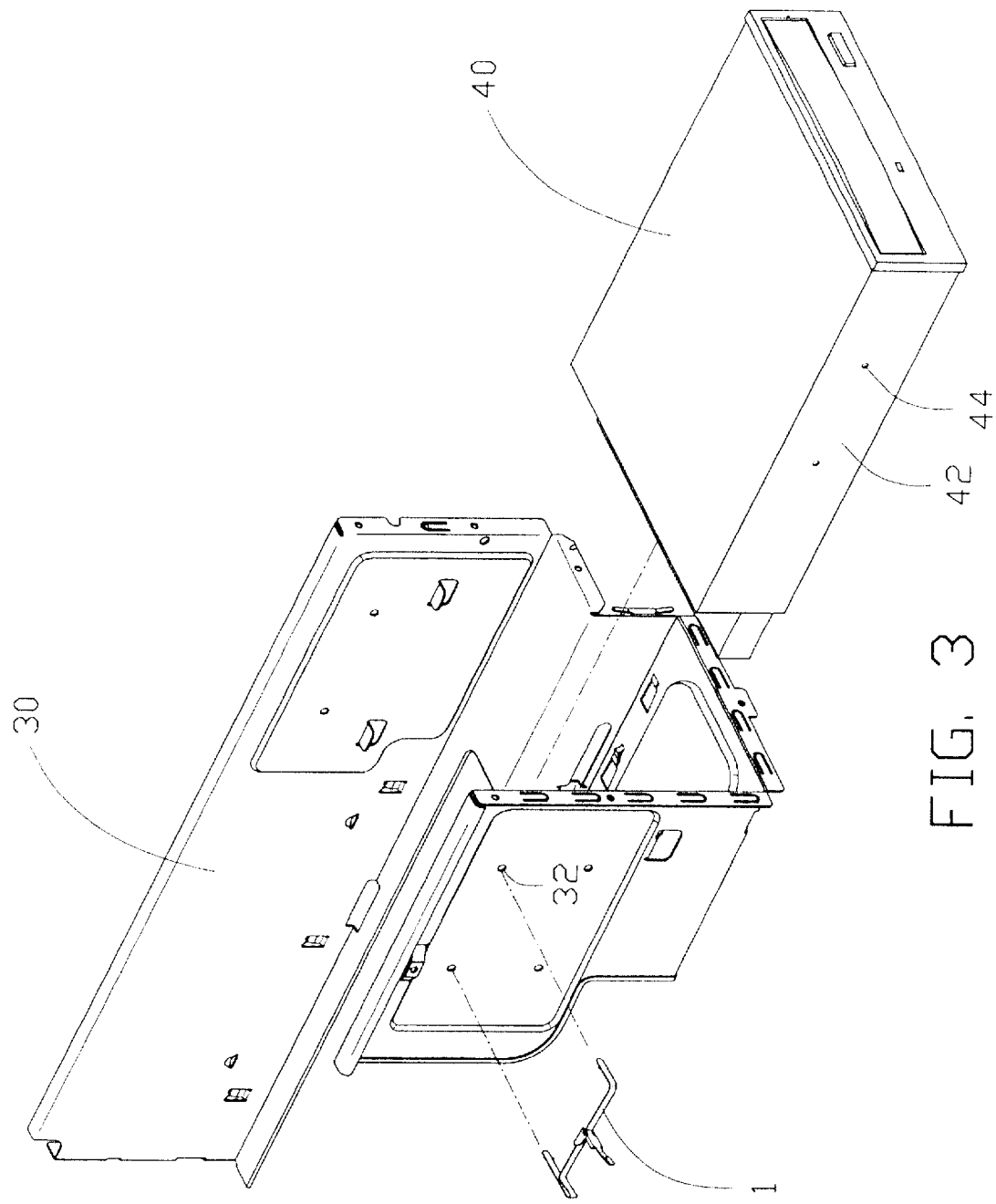
FIG. 3 is an exploded view showing the fastening device, a disk drive and a disk drive bracket.
Figure 4:
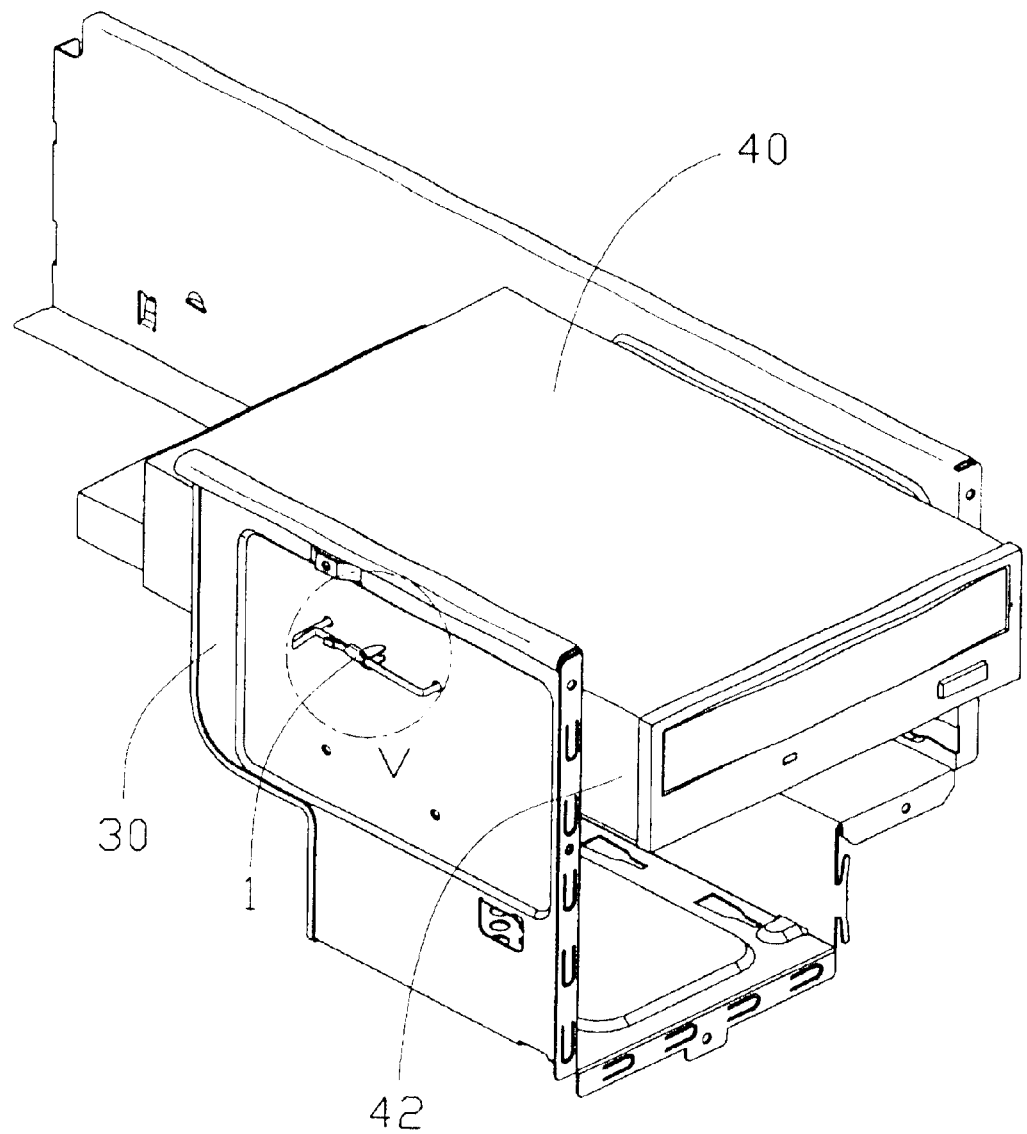
FIG. 4 is an assembled view of FIG. 3, showing the disk drive mounted to the disk drive bracket with the fastening device, the fastening device being in a locked position.
Figure 5:
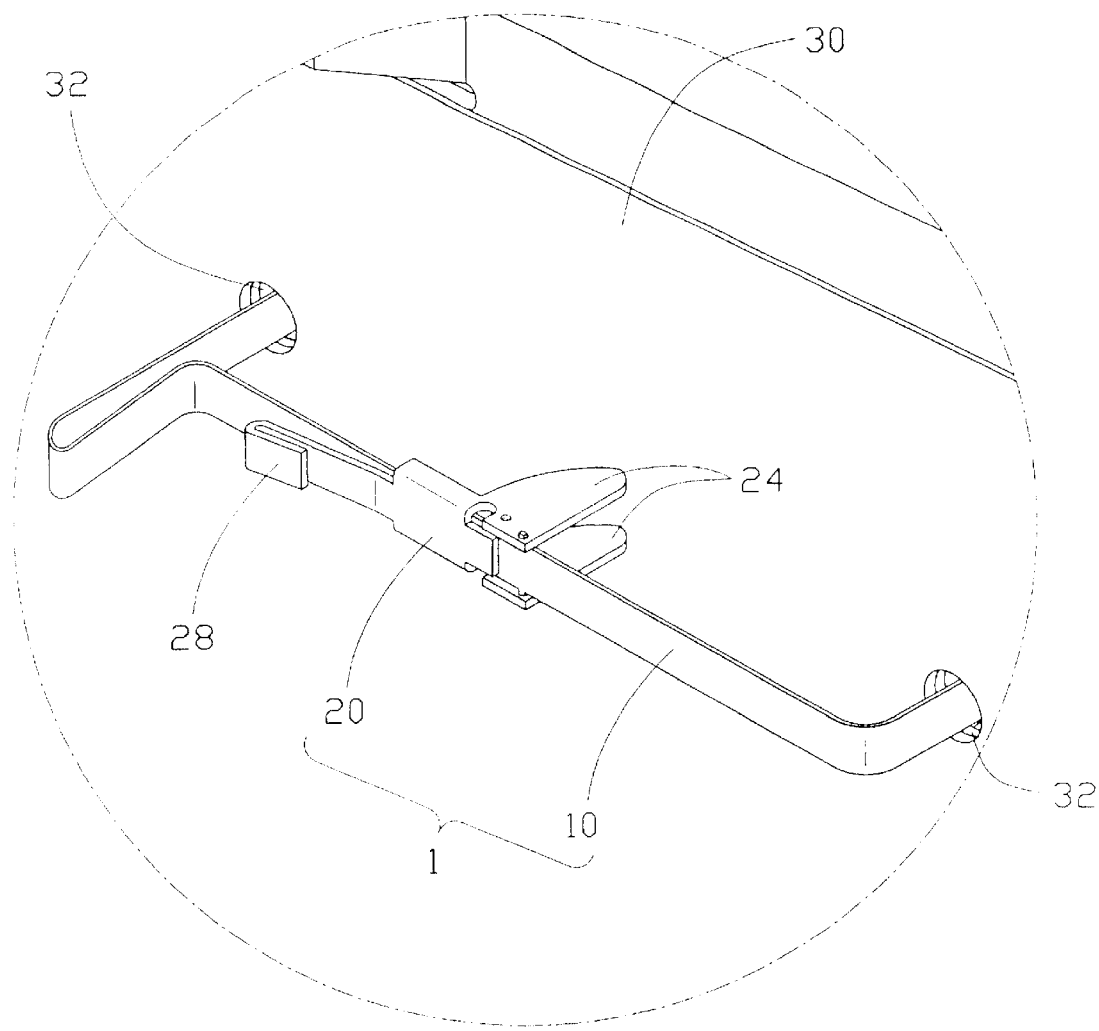
FIG. 5 is an enlarged view of the encircled portion of V of FIG. 4.

Also referring to FIG. 2, in assembly of the fastening device 1, the pivot protrusions 19 of the operating body 20 are extended into the corresponding pivot holes 26 of the operating body 20. The operating body 20 is oriented generally perpendicular to the connecting portion 12.

In use, the disk drive 40 is accommodated in the disk drive bracket 30. The through holes 32 of the disk drive bracket 30 are aligned with the corresponding locking apertures 44 of the disk drive 40. The locking arms 14 of the fastener 1 are extended into the corresponding through holes 32 and locking apertures 44. The barbs 18 of the locking arms 14 are loosely accommodated inside the side wall 42 of the disk drive 40. The operating body 20 is then pivoted toward the connecting portion 12. The cam-shaped side plates 24 press the side of the disk drive bracket 30, and force the clip 10 to move away from the disk drive bracket 30. The barbs 18 of the locking arms 14 are thereby interferentially engaged with the side walls 42 of the disk drive 40. The two stops 25 interferentially pass over the said opposite edges of the connecting portion 12, and prevent the operating body 20 from accidentally returning to its original position. Thus, the disk drive 40 is firmly secured to the disk drive bracket 30.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A fastening device adapted for securing a disk drive to a bracket, the fastening device comprising:

a clip having a connecting portion, a pair of locking wins extending perpendicularly away from opposite ends of the connecting portion, a handle extending perpendicularly from one end of the connecting portion, and further extending to double back over itself, a pair of barbs formed on each locking arm and adapted to engage with the disk drive, and a pair of protrusions formed at opposite edges of the connecting portion; and an operating body pivotably attached to the clip, the operating body having a middle plate, a pair of cam-shaped side plates extending perpendicularly from opposite lateral edges of the middle plate, and a pair of pivot holes defined in the side plates for accommodating the protrusions of the clip, wherein when the operating body is pivoted toward the connecting portion, the cam-shaped side plates press the bracket and drive the clip to move away from the bracket, wherein a pair of opposing stops is formed at inner faces of the side plates of the operating body, and wherein when the operating body is pivoted toward the connecting portion, the stops interferentially pass over the connecting portion and prevent the operating body from accidentally returning to its original position.

2. The fastening device as described in claim 1, wherein the operating body further comprises a manipulating portion extending from the middle plate.

* * * * *